Patented Nov. 7, 1939

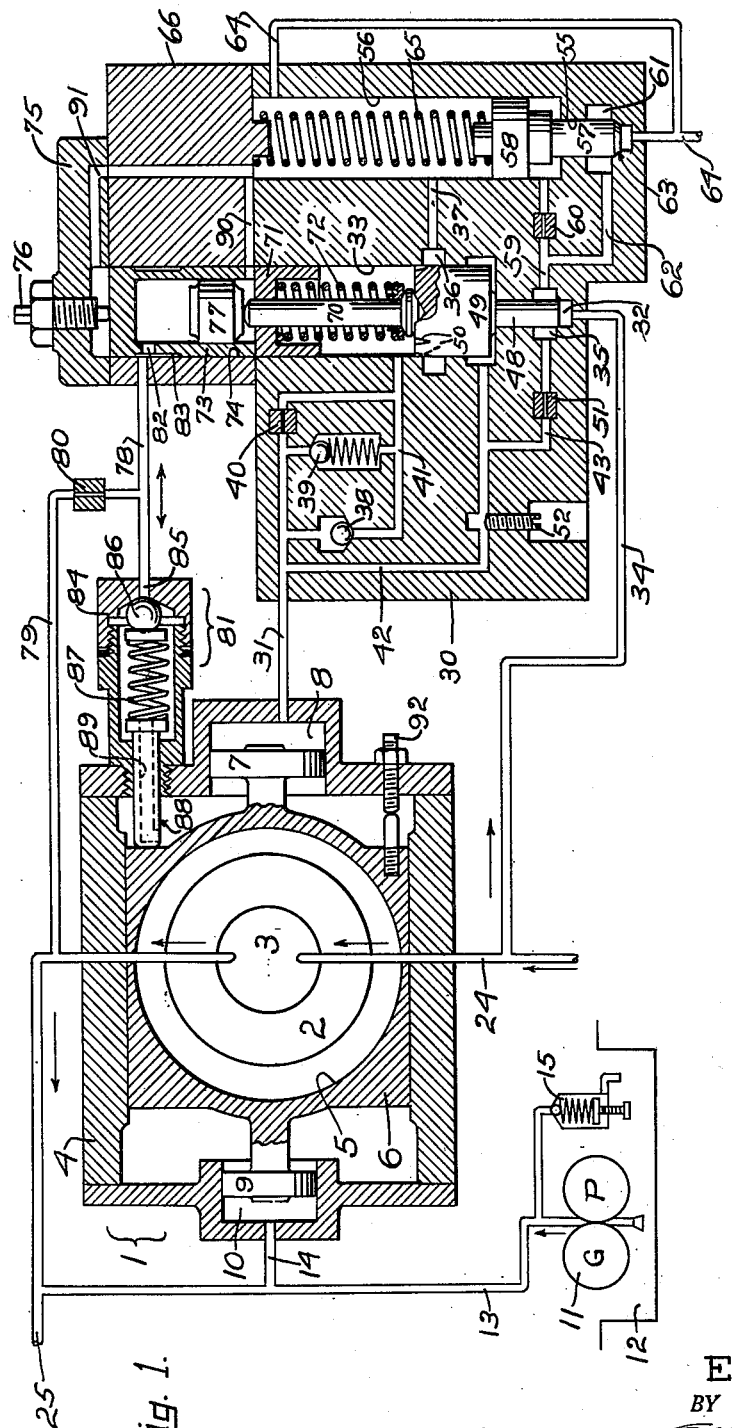

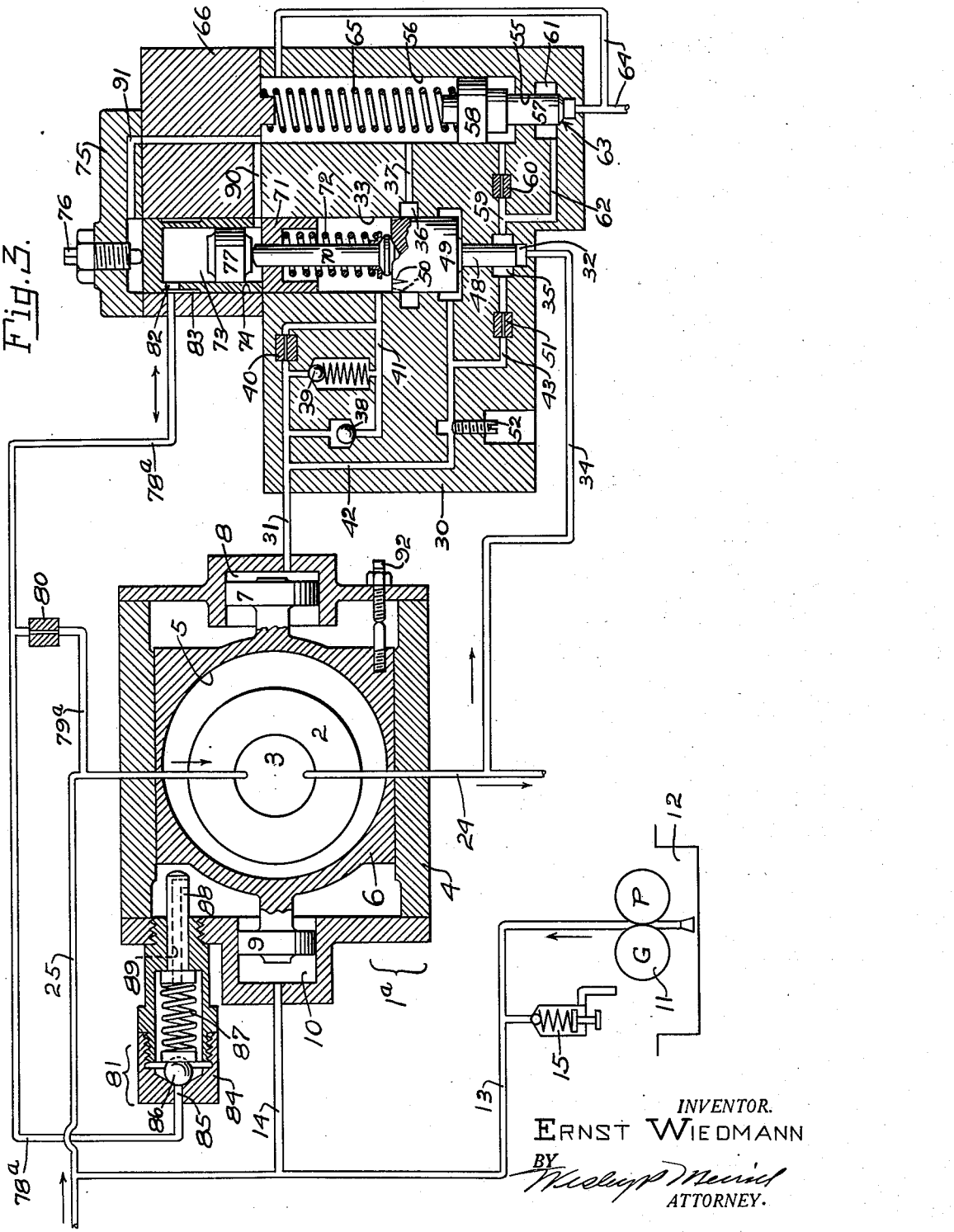

2,179,071

UNITED STATES PATENT OFFICE 2,179,071

CONTROL FOR HYDRODYNAMIC MACHINES

Ernst Wiedmann, Milwaukee, Wis., assignor to The Oilgear Company, Milwaukee, Wis., a corporation of Wisconsin Application April 9, 1938, Serial o. 201,120

23 Claims. (Cl. 103—38)

This invention relates to controls for hydrodynamic machines of the types employed to translate rotary mechanical motion into a flow of fluid or vice versa.

The control to which the invention relates in particular is employed to vary the displacement of a hydrodynamic machine in response to a variation in pressure of the motive fluid, such as the pump control shown in Patent 2,080,810.

A rotary hydrodynamic machine will function as a motor when supplied with liquid under pressure and its torque will vary in accordance with variations in motor displacement or liquid pressure. If a rotary motor were supplied with liquid at a uniform rate and it were provided with a pressure responsive control which would vary motor displacement directly in proportion to variations in pressure, the motor would drive its load at a speed which would vary inversely to variations in the magnitude of the load so that the power output of the motor would be uniform if the motor had no internal losses.

However, all hydraulic motors have internal losses, and these losses are greater in proportion to the torque at small motor displacements than at greater motor displacements. Consequently, the pressure responsive controls heretofore provided are not capable of maintaining the power output of a hydraulic motor substantially constant.

The control shown in Patent 2,080,810 permits the pump to which it is applied to deliver liquid at a predetermined rate until pump pressure reaches a predetermined maximum and then the control reduces pump displacement until the pump is delivering just sufficient liquid to maintain that maximum pressure substantially constant. The control operates very efficiently and is capable of maintaining the predetermined maximum pressure within close limits unless pump pressure is increased beyond the predetermined maximum substantially instantaneously, as by the instantaneous stalling of the motor driven by the pump, in which case the displacement varying member of the pump is moved so rapidly that it is carried by its inertia beyond the point at which it should stop to enable the pump to deliver liquid at the rate required to maintain the maximum pressure constant. While the displacement varying member is ordinarily moved only a few thousandths of an inch beyond the point at which it should stop, this slight additional movement causes a slight momentary drop in pump pressure before the control can retract the displacement varying member to the proper position.

The present invention has as an object to provide a control which will maintain the power output of a hydraulic motor substantially constant.

Another object is to provide a control which when applied to a pump will respond to a predetermined maximum pump pressure and reduce pump displacement until the pump is delivering just sufficient liquid to maintain that maximum pressure substantially constant regardless of how rapidly pump pressure is increased.

Another object is to provide a control of the above character which is positive and precise in operation.

Other objects and advantages of the invention will appear from the description hereinafter given of controls in which the invention is embodied.

According to the invention in its general aspect and as ordinarily embodied in practice, a hydrodynamic machine is provided with means for varying its displacement, means for effecting operation of the displacement varying means in response to the fluid pressure in the machine varying above and below a given value, and means operable in response to operation of the displacement varying means for changing the pressure value at which operation of the displacement varying means is effected.

The invention is exemplified by the controls shown schematically in the accompanying drawings in which the views are as follows:

Fig. 1 is a view showing a rotary hydraulic motor provided with a control in which the invention is embodied.

Fig. 2 is a diagram of a hydraulic transmission which includes a motor of the type shown in Fig. 1.

Fig. 3 is a view showing a pump provided with a control in which the invention is embodied.

Figure 4:
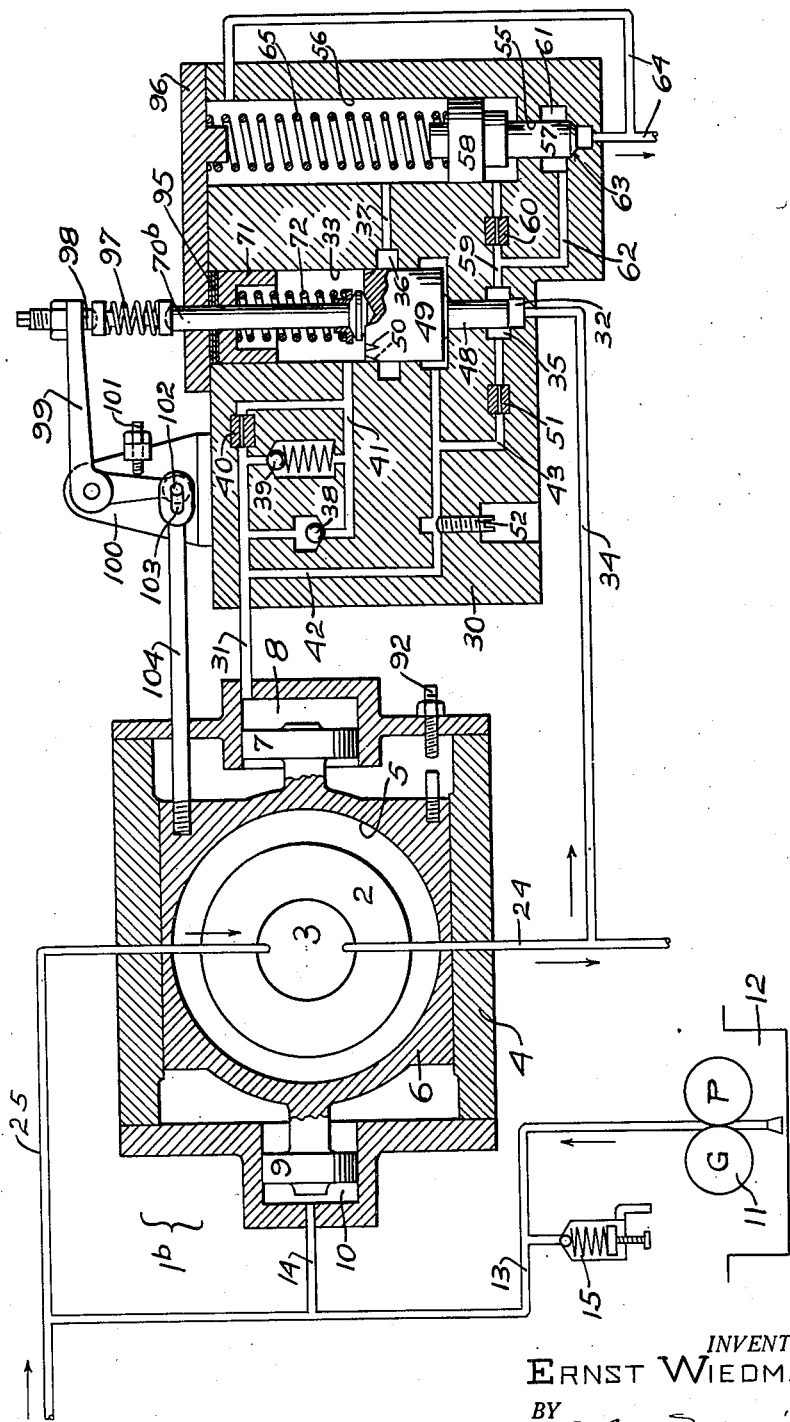
Fig. 4 is a view similar to Fig. 3 but showing a modification of the invention.

For the purpose of illustration, the invention has been shown as being employed to control hydrodynamic machines of the rolling piston type but it is to be understood that the invention may as readily be employed to control other types of hydrodynamic machines.

Figs. 1 and 2

These figures show the invention applied to a hydrodynamic machine 1 which functions as a motor. Since machine 1 is of the rolling piston type which is fully illustrated and described in Patent 1,998,984, only a brief description thereof will be given herein.

Machine 1 has its pistons and cylinders arranged radially in a cylinder barrel 2 which rotates upon a valve shaft or pintle 3 through which liquid flows to and from the cylinders. Pintle 3 is arranged within and rigidly secured in a stationary position by a closed casing 4 which encloses the mechanism of the machine.

The outer ends of the pistons react against an annular reaction surface 5 which has been shown as being formed in a displacement varying member or slide block 6 but which in practice is formed in a separate thrust member arranged within slide block 6 and rotatably supported thereby.

Slide block 6 is shiftable transversely of pintle 3 to vary the displacement of the machine but is restrained by casing 4 from movement in any other direction. The displacement of the machine increases as slide block 6 is shifted to move the axis of reaction surface 5 away from the axis of cylinder barrel 2, the displacement being zero when the two axes coincide.

Slide block 6 is adapted to be moved toward the left or in a direction to increase motor displacement by a piston 7 which is connected to slide block 6 and fitted in a stationary cylinder 8 to which liquid is supplied under the control of mechanism to be presently described.

Slide block 6 is constantly urged toward the right or in a direction to decrease the motor displacement by a piston 9 which is connected to slide block 6 and fitted in a stationary cylinder 10 to which liquid is supplied at a constant pressure by a gear pump 11.

For the purpose of illustration, gear pump 11 has been shown as an independent pump which draws liquid from a reservoir 12 and discharges it into a channel 13 to which cylinder 10 is connected by a channel 14. Gear pump 11 discharges liquid at a rate in excess of requirements and all excess liquid is exhausted through a relief valve 15 which is connected to channel 13 and which causes gear pump 11 to maintain a constant pressure in cylinder 10.

In practice however, a hydrodynamic machine which is to function as a pump is ordinarily provided with an auxiliary gear pump which is driven in unison therewith and arranged within the casing thereof as shown in Patent 1,998,984 referred to above. If the hydrodynamic machine to be controlled is to function as a pump, gear pump 11 is ordinarily arranged in the casing thereof but, if it is to function as a motor, gear pump 11 is ordinarily arranged within the casing of the pump which energizes it.

Machine 1 has been shown in Fig. 2 as being employed as a motor to drive a winding shaft 20 to which it is connected in any suitable manner as by means of a chain drive 21.

Liquid for energizing machine 1 is supplied thereto by pump 22 which is driven in any suitable manner as by means of a drive 23. Pump 22 delivers liquid to machine 1 through a pressure channel 24 and has liquid returned to it from the machine 1 through a return channel 25 to which gear pump discharge channel 13 is connected to enable gear pump 11 to supercharge pump 22 and make up leakage losses according to the usual practice. Except when being started, stopped, or adjusted for a different speed, pump 22 is driven at a substantially constant speed and delivers liquid to a machine 1 at a substantially uniform rate.

Winding shaft 20 when rotated is adapted to wind a web of paper 26 into a roll 27. Web 26 is delivered to shaft 20 by a paper making or processing machine (not shown) at a substantially constant rate, and it should have a substantially uniform tension maintained thereon in order that the density of roll 27 may be uniform.

Since web 26 is delivered to shaft 20 at a uniform rate, machine 1 must drive shaft 20 at high speed and exert a low torque when roll 27 is small and its speed must progressively decrease and its torque must progressively increase as roll 27 progressively increases in diameter in order to maintain a substantially uniform tension upon web 26.

Since the speed and torque of a rotary hydraulic motor are proportional to motor displacement if the motor is energized by liquid supplied thereto at a uniform rate and at a uniform pressure, it follows that the displacement of machine 1 must be progressively increased as roll 27 progressively increases in diameter.

The displacement of the machine is increased by liquid which enters cylinder 8 and causes piston 7 to move slide block 6 toward the left, and it is decreased by permitting liquid to escape from cylinder 8 so that the liquid which gear pump 11 constantly tends to deliver to cylinder 10 can cause piston 9 to move slide block 6 toward the right.

In practice, liquid for operating servo-motor 7—8 is at times supplied by gear pump 11. At other times and as shown in the drawing, liquid for operating servo-motor 7—8 is supplied by the machine itself if the machine functions as a pump or by the pump which energizes the machine if the machine functions as a motor. In either case, the flow of liquid to and from cylinder 8 is under the control of a valve which is at all times subjected to the pressure prevailing in the machine being controlled.

The flow of liquid to and from cylinder 8 is under the control of mechanism arranged within a control casing 30 which is connected to cylinder 8 by a channel 31 and which is ordinarily attached to or formed integral with the casing of the machine being controlled.

As shown, control casing 30 has a bore 32 and a counterbore 33 formed therein concentric with each other. Bore 32 is connected to pressure channel 24 by a channel 34 and has formed in the wall thereof an annular port 35 through which liquid may flow from channel 34 to cylinder 8 as will presently appear, and counterbore 33 has formed in the wall thereof an annular port 36 through which liquid may escape from cylinder 8 into a drain channel 37 as will presently appear.

Channel 31 is connected through a check valve 38, and oppositely opening resistance valve 39 and a choke 40 to a channel 41 which communicates with counterbore 33 at a point spaced above port 36. Channel 31 is also connected to the lower end of counterbore 33 by a channel 42 which is connected intermediate its ends to port 35 by a channel 43.

The arrangement is such that, when port 35 is opened and port 36 is closed, liquid from pressure channel 24 may flow through channel 34, port 35, and channels 43, 42, and 31 to cylinder 8 and cause piston 7 to move slide block 6 in a direction to increase the displacement of motor 1 and, when port 35 is closed and port 36 is opened, the liquid delivered to cylinder 10 by gear pump 11 will cause piston 9 to move slide block 6 in the opposite direction and cause piston 7 to eject liquid from cylinder 8 through channel 31, resistance valve 39, channel 41, counterbore 33 and port 36 into drain channel 37.

The flow of liquid to and from cylinder 8 is controlled by a control valve which consists of a valve member 48 and a piston 49 formed integral with each other. Valve member 48 is closely fitted in bore 32 to control the flow of liquid from channel 34 into port 35, and piston 49 is fitted in counterbore 33 to control the flow of liquid from counterbore 33 into drain port 36, the upper edge of piston 49 ordinarily having formed therein a plurality of small tapered grooves or slots 50 which throttle the flow from counterbore 33 into drain port 36.

The vertical distance between the lower end of valve member 48 and the bottoms of slots 50 is ordinarily equal to the vertical distance between the lower edge of port 35 and the upper edge of port 36 so that, when the control valve has been raised until the bottom of valve member 48 is even with the bottom edge of port 35, the bottoms of slots 50 will be even with the upper edge of port 36. Then, a very slight movement of the control valve in either direction will open either port 35 to high pressure channel 24 or counterbore 33 to drain channel 37.

The rate at which liquid may flow from port 35 into channel 42 is controlled by a choke 51 which is arranged in channel 43 to restrict the flow therethrough, and the flow of liquid from channel 43 to cylinder 8 is restricted by throttle valve 52 arranged in channel 42.

In addition to controlling the flow of liquid to and from cylinder 8, control valve 48—49 also controls the operation of a high pressure relief valve which protects the machine from excessive pressures. As shown, casing 30 has a bore 55 and a counterbore 56 formed therein concentric with each other, and a relief valve 57 is closely fitted in bore 55 and fixed to a piston 58 which is fitted in counterbore 56.

The lower end of counterbore 56 is connected to port 35 by a channel 59 which has a choke 60 arranged therein. The lower end of bore 55 opens into a chamber 61 which is connected by a channel 62 to channel 59 at a point between port 35 and choke 60.

Chamber 61 has a valve seat 63 formed in the bottom wall thereof around the end of a drain channel 64 through which liquid may escape from chamber 61 when valve 57 is raised. Drain channel 64 is also connected to counterbore 56 near the upper end thereof to permit liquid to escape therefrom when piston 58 is raised and also for the reason that drain channel 37 has been shown connected to counterbore 56.

Valve 57 is urged downward against valve seat 63 by a helical compression spring 65 arranged in counterbore 56 between piston 58 and a block 66 which is fastened to casing 30 and closes the upper end of counterbore 56.

When control valve 48—49 is raised so that port 35 is open to channel 34, pressure will extend through channel 59 to the lower end of counterbore 56 and tend to move piston 58 and relief valve 57 upward to open port 61 to drain channel 64 but piston 58 will not move upward until the pressure in the lower end of counterbore 56 is sufficient to overcome the resistance of spring 65. Consequently, the pressure required to raise relief valve 57 will always be a predetermined amount higher than the pressure required to raise control valve 48—49. The arrangement is such that adjusting the mechanism to cause the control valve to respond to a higher or lower pressure will simultaneously cause the relief valve to respond to a correspondingly higher or lower pressure.

Since pressure channel 24 is connected by channel 34 to the lower end of bore 32, the lower end of valve member 48 is exposed at all times to the pressure prevailing in channel 24. Consequently, the control valve is constantly urged upward, or in a direction to open port 35 and to close port 36, by a force proportional to the pressure prevailing in channel 24.

The control valve is urged downward, or in a direction to close port 35 and to open port 36, by two separate forces one of which remains constant after being regulated and the other of which is varied in response to movement of slide block 6.

As shown, both of these forces are transmitted to piston 49 through a rod 70 which is arranged in counterbore 33 and has an enlarged head formed upon its lower end and in contact with the upper end of piston 49. The upper end of rod 70 extends through and is closely fitted in a bushing 71 which is closely fitted in counterbore 33 and closes the upper end thereof.

One of the forces for urging the control valve downward is provided by a helical compression spring 72 which encircles rod 70 and has its upper end in contact with bushing 71 and its lower end in contact with a suitable spring retainer arranged upon rod 70 and in contact with the head thereof.

Upward movement of bushing 71 under the influence of spring 72 is prevented by a cylinder 73 which is fitted in a bore 74 formed in block 66 concentric with counterbore 33. The upper end of bore 74 is closed by a cap 75 which is fastened to the top of block 66 and has an adjusting screw 76 threaded therethrough into contact with the head of cylinder 73. By turning screw 76, cylinder 73 and bushing 71 may be moved downward or permitted to move upward to thereby vary the tension of spring 72 with the resultant variation in the force required to raise the control valve.

The other force for urging the control valve downward is transmitted thereto through rod 70 by means of a piston 77 which is fitted in cylinder 73 and engages the upper end of rod 70.

Liquid for energizing piston 77 is supplied to cylinder 73 by gear pump 11. As shown, gear pump discharge channel 13 is connected to return channel 25 so that gear pump 11 may maintain in channel 25 a pressure equal to the pressure required to open relief valve 15. Channel 25 is connected to a channel 78 by a channel 79 having a choke 80 arranged therein to limit the flow therethrough to a very limited rate. Channel 78 has one of its ends connected to a relief valve 81 and its other end extending through the wall of bore 74 and communicating with the interior of cylinder 73 through a port 82 formed in the side wall thereof. In order that port 82 may remain in communication with channel 78 when cylinder 73 is raised or lowered to adjust the tension of spring 72, port 82 communicates with a wide groove 83 formed in the outer peripheral surface of cylinder 73.

As shown, relief valve 81 has its casing 84 attached to casing 4 of the machine and provided with an inlet 85 which is controlled by a valve member 86 and to which channel 78 is connected. A spring 87 urges valve member 86 toward inlet 85 and reacts against a valve stem 88 which extends through the side wall of casing 4 into contact with slide block 6 and has formed therein a channel 89 through which liquid may flow from casing 84 into casing 4, it being understood that casing 4 is drained according to the usual practice by means of a suitable drain channel not shown.

The arrangement is such that liquid delivered by gear pump 11 into channel 78 escapes through relief valve 81 the resistance of which enables gear pump 11 to maintain in channel 78 and in cylinder 73 a pressure which causes piston 77 to urge control valve 48—49 downward with a force proportional to the resistance of relief valve 81. Any liquid escaping past piston 77 and past the upper end of cylinder 73 is drained into counterbore 56 through drain channels 90 and 91.

When slide block 6 is moved toward the right to increase the displacement of the machine, it will move valve stem 88 toward the right and cause it to compress spring 87 so that a higher pressure will be required to open relief valve 81 and, when slide block 6 is moved toward the left to decrease the displacement of the machine, it will permit spring 87 to expand so that relief valve 81 may be opened by a lower pressure. It is to be understood that the pressure required to open relief valve 15 is higher than the greatest pressure required to open relief valve 81.

Operation

Since placing relief valve 57 under the control of valve 48—49 and the use of resistance valve 39, throttle valve 52 and chokes 50 and 51 to obtain smooth and accurate operation of the control mechanism are features of an invention made by another, a detailed explanation thereof will not be given herein. It is deemed sufficient to state that choke 51 limits the rate at which the displacement of motor 1 may be increased, that the drop in pressure across throttle valve 52 assists in operating valve 48—49, and that resistance valve 39 prevents valve 48—49 from hunting.

When the load is removed from motor 1, the pressure in channels 24 and 34 will drop to a low value and spring 72 will move control valve 48—49 downward to open counterbore 33 to drain port 36 so that liquid can escape from cylinder 8 as previously explained.

Then liquid from gear pump 11 will flow through channels 13 and 14 to cylinder 10 and cause piston 9 to move slide block 6 toward the right to the position shown in Fig. 1 at which time the displacement of motor 1 has been reduced to a predetermined minimum and further movement of slide block 6 has been arrested as by means of a stop 92.

Assuming that motor 1 is at a minimum stroke, that pump 22 has just started to deliver liquid to motor 1, that a web of paper 26 is being delivered to winding shaft 20 at a uniform rate, and that shaft 20 has wound paper previously delivered into a semi-finished roll 27, the apparatus will function as follows:

Motor 1 being at minimum stroke will at first tend to rotate shaft 20 at a rate greater than the rate required to wind web 26 thereon as it is delivered thereto. Consequently, motor 1 will tend to exert upon web 26 a tension greater than the desired tension as determined by the adjustments of spring 72 and relief valve 81.

The motor torque required to produce this tension will cause pressure to rise in channel 24, and this pressure will extend through channel 34 to the lower end of bore 32 and raise valve 48—49. Liquid will then flow from channel 24 through channel 34, bore 32, port 35 and channels 43, 42 and 31 to cylinder 8 and cause piston 7 to move slide block 6 toward the left to increase the displacement of motor 1.

Since pump 22 delivers liquid to motor 1 at a uniform rate, increasing the displacement of motor 1 will decrease the speed at which it tends to operate. Piston 7 will continue to move slide block 6 toward the left until motor 1 is driving shaft 20 at the correct speed and is maintaining upon web 26 a tension proportional to the combined forces exerted upon control valve 48—49 by spring 72 and piston 77 at which time the control valve will descend until the lower end of valve member 48 is in alinement with the lower edge of port 35 and the bottoms of slots 50 are in alinement with the upper edge of port 36 so that the liquid in cylinder 8 is trapped therein and prevents movement of slide block 6 as long as the control valve remains in this position.

The force exerted by the motive liquid upon the lower end of valve member 48 and the combined forces exerted by spring 72 and piston 77 upon piston 49 will cause control valve 48—49 to float in a balanced condition as long as the tension of web 26 remains constant but a very slight variation in this tension with a resultant slight variation in the pressure of the motive liquid will cause valve 48—49 to move slightly in one direction or the other and permit a minute volume of liquid to flow to or escape from cylinder 8 and thereby cause a minute movement of slide block 6 to correct such variation in the tension of web 26.

Winding up web 26 causes roll 27 to progressively increase in diameter with the result that its peripheral speed increases relative to its rotary speed and a progressively increasing torque is required to rotate it.

This progressively increasing torque tends to produce a progressively increasing pressure in channel 24 but, just as soon as the pressure in channel 24 slightly exceeds the pressure determined by the adjustment of spring 72 and relief valve 81, the force exerted by the liquid upon the lower end of valve member 48 raises valve 48—49 so that the displacement of motor 1 is progressively increased with the result that motor 1 has its speed progressively decreased and its torque progressively increased as roll 27 progressively increases in diameter, thereby enabling the apparatus to maintain a substantially uniform tension upon web 26 and to wind it into a roll of substantially uniform density.

Since a rotary hydraulic motor has greater internal losses relative to its power output when at short stroke than when at long stroke, motor 1 would be unable to maintain a uniform tension upon web 26 if control valve 48—49 were urged downward by a substantially constant force, such as being urged downward solely by a spring.

The present invention however provides a control in which the magnitude of the downward force exerted upon the control valve is determined by relief valve 81 which is adjusted in response to movement of slide block 6 to thereby vary this downward force inversely but not in proportion to variations in the stroke of the motor. The control thus enables motor 1 to have sufficient starting torque and to maintain a substantially uniform tension upon web 26.

Fig. 3

The control has been shown in this figure applied to a hydrodynamic machine 1ᵃ which is exactly the same as machine shown in Fig. 1 except that it is adapted to function as a pump. Consequently, like parts of the two machines have been indicated by like reference numerals and no further description thereof will be given. It is deemed sufficient to state that pump 1ᵃ discharges into pressure channel 24 and has liquid returned to it through return channel 25 to which gear pump discharge channel 13 is connected.

Since machine 1ᵃ is to function as a pump, relief valve 81 is connected to the left end of casing 4 and has its inlet connected to bore 74 in block 66 by a channel 78ᵃ which corresponds to channel 78 and to which return channel 25 is connected by a channel 79ᵃ which corresponds to channel 79 and has a choke 80 arranged therein.

As ordinarily employed, a pump provided with a pressure responsive control delivers liquid at a predetermined volumetric rate to a hydraulic motor until the load on the motor causes pump pressure to reach a predetermined maximum and then the control reduces pump displacement until the pump is delivering just sufficient liquid to maintain that maximum pressure constant. That is, the pump delivers just sufficient liquid to make up for leakage losses at that maximum pressure.

If pump pressure does not rise too suddenly, pump displacement may be reduced to the proper value by a control in which the control valve is urged downward by a single substantially constant force, such as the force exerted upon valve 48—49 by spring 72.

However, if the motor should suddenly stall and cause pump pressure to suddenly exceed a predetermined maximum, the displacement varying member of the pump would be moved toward its zero displacement position so rapidly that it would not stop until after it had passed the position which it must occupy to enable the pump to deliver sufficient liquid to make up for leakage losses. Consequently, pump pressure would drop below the predetermined maximum and then the control would move the displacement varying member in the opposite direction until the pump was delivering just sufficient liquid to maintain the predetermined maximum pressure constant. In other words, the displacement varying member or slide block would tend to hunt if pump pressure suddenly exceeded the predetermined maximum.

In order to overcome the tendency of the displacement varying member to hunt, relief valve 81 is attached to the left end wall of casing 4 and so proportioned that slide block 6 will engage the end of valve stem 88 when it reaches a position at which pump displacement is at a predetermined minimum.

The arrangement is such that pump 1ᵃ will deliver liquid at a predetermined rate until pump pressure reaches the value determined by the tension of spring 72 and the initial resistance of relief valve 81. Then valve 48—49 will rise and permit liquid to enter cylinder 8 and move slide block 6 toward the left to reduce pump displacement until slide block 6 engages valve stem 88 and moves it toward the left. Stem 88 will increase the tension of spring 87 and thereby increase the force exerted upon valve 48—49 by piston 77 so that a slightly greater pump pressure is required to hold up valve 48—49 and to effect further movement of slide block 6. This results in slide block 6 being momentarily retarded so that it will not overrun the position at which pump 1ᵃ will deliver sufficient liquid to make up for the leakage losses at the maximum pressure.

While the final maximum pump pressure is greater than the pressure at which the pump starts to unload, the difference between those two pressures is so slight as to be of no importance in actual practice.

Fig. 4

This figure shows a pump 1ᵇ and a control therefor which are identical, respectively, with the pump and the control shown in Fig. 3 except that the downward force exerted upon the control valve is varied mechanically instead of hydraulically. Consequently, like parts have been indicated by like reference numerals and no further description thereof will be given.

As shown, the tension of spring 72 is adjusted by means of shims 95 arranged between bushing 71 and a cover plate 96 which are attached to the top of casing 30. Spring 72 exerts a substantially constant downward force upon control valve 48—49 as previously explained. A variable downward force is also exerted thereon by a helical compression spring 97 arranged above cover plate 96 in contact with the upper end of a rod 70ᵇ which extends through cover plate 96 into contact with piston 49 and corresponds to the rod 70 shown in Figs. 1 and 3.

Spring 97 is arranged between the upper end of rod 70ᵇ and an adjusting screw 98 fixed in the horizontal arm of a bell crank lever 99 which is pivoted at the junction of its arms upon a bracket 100 arranged upon the top of casing 30. The other arm of lever 99 extends downward and is engaged by a stop screw 101 which is carried by bracket 100 and limits the upward movement of the horizontal arm of lever 99. A pin 102 is fixed in the lower end of the depending arm of lever 99 and arranged in a slot 103 formed in one end of a rod 104 the other end of which is fastened to slide block 6.

The arrangement is such that pump 1ᵇ will deliver liquid at a predetermined rate until pump pressure reaches the value determined by the tension of spring 72 and the initial tension of spring 97. Then valve 48—49 will rise and cause slide block 6 to move toward the left to reduce pump displacement as previously explained.

Slide block 6 will move rod 104 with it and, when pump displacement has been reduced to a predetermined minimum, the end of slot 103 will engage pin 102 and swing bell crank lever 99 to increase the tension of spring 97, thereby increasing the downward force exerted upon control valve 48—49 and preventing slide block 6 from overrunning the position at which pump 1ᵇ will deliver sufficient liquid to make up for the leakage losses at the maximum pressure as previously explained.

The invention herein set forth is susceptible of various modifications and adaptations without departing from the scope thereof as hereafter claimed.

The invention is hereby claimed as follows:

1. The combination, with a hydrodynamic machine having means for varying its displacement, of means for effecting operation of said displacement varying means in response to the fluid pressure in said machine varying above or below a given value, and means operable only in response to said displacement varying means reducing the displacement of said machine below a predetermined minimum for changing the pressure value at which operation of said displacement varying means is effected.

2. The combination, with a hydrodynamic machine having a member operable through a given range for varying the displacement of said machine through a given range, of means for effecting operation of said displacement varying member in response to the fluid pressure in said machine varying above or below a given value, and means operable in response to operation of said displacement varying member in a given part only of its range for changing the pressure value at which operation of said displacement varying member is effected.

3. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, means for urging said valve in the opposite direction with a force which tends to balance the first mentioned force whereby a variation in the pressure prevailing at said high pressure port will unbalance said forces and cause said valve to be moved in one direction or the other, and means operable only in response to said displacement varying member reducing the displacement of said machine below a predetermined minimum for varying the force which urges said valve in said opposite direction.

4. In a hydrodynamic machine having a high pressure port, a low pressure port, a member shiftable in one direction or the other in a given range to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, means for urging said valve in the opposite direction with a force which tends to balance the first mentioned force whereby a variation in the pressure prevailing at said high pressure port will unbalance said forces and cause said valve to be moved in one direction or the other, and means operable in response to movement of said displacement varying member in a given part only of its range for varying the force which urges said valve in said opposite direction.

5. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, spring means and fluid pressure means coacting to urge said valve in the opposite direction with a force which tends to balance the first mentioned force whereby a variation in the pressure prevailing at said high pressure port will unbalance said forces and cause said valve to be moved in one direction or the other, means for supplying liquid under pressure to said fluid pressure means to energize the same, and means for varying the pressure in said fluid pressure means in response to movement of said displacement varying member.

6. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, spring means and fluid pressure means coacting to urge said valve in the opposite direction with a force which tends to balance the first mentioned force whereby a variation in the pressure prevailing at said high pressure port will unbalance said forces and cause said valve to be moved in one direction or the other, means for limiting the pressure in said fluid pressure means, and means for adjusting said pressure limiting means in response to movement of said displacement varying member.

7. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, spring means and fluid pressure means coacting to urge said valve in the opposite direction with a force which tends to balance the first mentioned force whereby a variation in the pressure prevailing at said high pressure port will unbalance said forces and cause said valve to be moved in one direction or the other, means for supplying liquid at a limited rate to said fluid pressure means to energize the same, a relief valve for permitting liquid to escape from said fluid pressure means, and means responsive to movement of said displacement varying means for adjusting said relief valve to thereby vary the pressure in said fluid pressure means.

8. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, spring means and fluid pressure means coacting to urge said valve in the opposite direction with a force which tends to balance the first mentioned force whereby a variation in the pressure prevailing at said high pressure port will unbalance said forces and cause said valve to be moved in one direction or the other, an auxiliary pump, fluid channels connecting said fluid pressure means to said pump and having a choke connected therein to cause said pump to deliver liquid at a limited rate to said fluid pressure means, a relief valve for limiting the pressure in said fluid pressure means, and means for adjusting said relief valve in response to movement of said displacement varying member.

9. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, means for exerting a substantially constant force upon said valve in the opposite direction, means for exerting an additional force upon said valve in said opposite direction, the sum of said last mentioned forces tending to balance said first mentioned force whereby a variation in the pressure prevailing at said high pressure port will unbalance said forces and cause said valve to be moved in one direction or the other, and means for varying said additional force in response to movement of said displacement varying member.

10. In a hydrodynamic machine having a high pressure port, a low pressure port, a member shiftable in a given range in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, means for exerting a substantially constant force upon said valve in the opposite direction, means for exerting an additional force upon said valve in said opposite direction, the sum of said last mentioned forces tending to balance said first mentioned force whereby a variation in the pressure prevailing at said high pressure port will unbalance said forces and cause said valve to be moved in one direction or the other, and means for varying said additional force in response to movement of said displacement varying member in a given part only of said range.

11. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, means for exerting a substantially constant force upon said valve in the opposite direction, a cylinder arranged in a stationary position, a piston fitted in said cylinder, means for transmitting force from said piston to said valve in said opposite direction, means for supplying liquid under pressure to said cylinder to enable said piston to transmit force to said valve, the sum of said last mentioned forces tending to balance said first mentioned force whereby a variation in the pressure prevailing at said high pressure port will unbalance said forces and cause said valve to be moved in one direction or the other, and means operable in response to movement of said displacement varying member for varying the pressure in said cylinder.

12. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, means for exerting a substantially constant force upon said valve in the opposite direction, a cylinder arranged in a stationary position, a piston fitted in said cylinder, means for transmitting force from said piston to said valve in said opposite direction, means for supplying liquid under pressure to said cylinder to enable said piston to transmit force to said valve, the sum of said last mentioned forces tending to balance said first mentioned force whereby a variation in the pressure prevailing at said high pressure port will unbalance said forces and cause said valve to be moved in one direction or the other, means for limiting the pressure in said cylinder, and means operable in response to movement of said displacement varying member for adjusting said last named means to thereby vary the pressure in said cylinder.

13. In a hydrodynamic machine having a high pressure port, a low pressure port, a member shiftable in one direction or the other to increase or decrease the displacement of said machine and hydraulic means for causing said member to be shifted, the combination of means for supplying motive liquid to said hydraulic means including a valve movable in one direction or the other to effect operation of said hydraulic means and thereby cause said member to be shifted in one direction or the other, said valve being at all times urged in one direction by a force proportional to the pressure prevailing at said high pressure port, spring means for exerting a substantially constant force upon said valve in the opposite direction, means for adjusting the tension of said spring means, a cylinder arranged in a stationary position, a piston fitted in said cylinder, means for transmitting force from said piston to said valve in said opposite direction, means for supplying liquid under pressure to said cylinder to enable said piston to transmit force to said valve, the sum of said last mentioned forces tending to balance said first mentioned force whereby a variation in the pressure prevailing at said high pressure port will unbalance said forces and cause said valve to be moved in one direction or the other, and means operable in response to movement of said displacement varying member for varying the pressure in said cylinder.

14. The combination, with a rotary hydraulic motor supplied with motive fluid from a suitable source and having a displacement varying member constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, means for urging said valve in the opposite direction with a force which tends to balance the force exerted upon said valve by said motive liquid whereby a variation in the pressure of said motive liquid will unbalance said forces and cause said valve to be moved in one direction or the other, and means operable in response to said displacement varying member reducing motor displacement below a predetermined minimum for varying the force which urges said valve in said opposite direction.

15. The combination, with a rotary hydraulic motor supplied with motive fluid from a suitable source and having a displacement varying member constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, means for exerting a substantially constant force upon said valve in the opposite direction, means for exerting an additional force upon said valve in said opposite direction, the sum of said forces tending to balance the force exerted upon said valve by said motive liquid whereby a variation in the pressure of said motive liquid will unbalance said forces and cause said valve to be moved in one direction or the other, and means operable in response to movement of said displacement varying member for varying said additional force.

16. The combination, with a rotary hydraulic motor supplied with motive fluid from a suitable source and having a displacement varying member movable through a given range and constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, means for urging said valve in the opposite direction with a force which tends to balance the force exerted upon said valve by said motive liquid whereby a variation in the pressure of said motive liquid will unbalance said forces and cause said valve to be moved in one direction or the other, and means operable in response to movement of said displacement varying member through a given part only of its range for varying the force which urges said valve in said opposite direction.

17. The combination, with a rotary hydraulic motor supplied with motive fluid from a suitable source and having a displacement varying member movable through a given range and constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, means for exerting a substantially constant force upon said valve in the opposite direction, means for exerting an additional force upon said valve in said opposite direction, the sum of said forces tending to balance the force exerted upon said valve by said motive liquid whereby a variation in the pressure of said motive liquid will unbalance said forces and cause said valve to be moved in one direction or the other, and means operable in response to movement of said displacement varying member through a given part only of its range for varying said additional force.

18. The combination, with a rotary hydraulic motor supplied with motive fluid from a suitable source and having a displacement varying member constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, spring means for exerting a substantially constant force upon said valve in the opposite direction, fluid pressure means for exerting an additional force upon said valve in said opposite direction, the sum of said forces tending to balance the force exerted upon said valve by said motive liquid whereby a variation in the pressure of said motive liquid will unbalance said forces and cause said valve to be moved in one direction or the other, and means operable in response to movement of said displacement varying member for varying the force exerted upon said valve by said fluid pressure means.

19. The combination, with a rotary hydraulic motor supplied with motive fluid from a suitable source and having a displacement varying member constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, means for exerting a substantially constant force upon said valve in the opposite direction, fluid pressure means for exerting an additional force upon said valve in said opposite direction, the sum of said forces tending to balance the force exerted upon said valve by said motive liquid whereby a variation in the pressure of said motive liquid will unbalance said forces and cause said valve to be moved in one direction or the other, an auxiliary pump, fluid channels connecting said fluid pressure means to said pump and having a choke connected therein to cause said pump to deliver liquid at a limited rate to said fluid pressure means, a relief valve for limiting the pressure in said fluid pressure means, and means for adjusting said relief valve in response to movement of said displacement varying member.

20. The combination, with a rotary hydraulic motor supplied with motive fluid from a suitable source and having a displacement varying member constantly urged in a direction to decrease motor displacement, a servo-motor for moving said member in a direction to increase motor displacement, and means for supplying liquid to said servo-motor to operate the same, of a valve for controlling the flow of liquid to and from said servo-motor and being at all times subjected to the pressure of said motive liquid and urged thereby in a direction to direct liquid to said servo-motor, means for exerting a substantially constant force upon said valve in the opposite direction, a cylinder arranged in a stationary position, a piston fitted in said cylinder, means for transmitting force from said piston to said valve in said opposite direction, means for supplying liquid under pressure to said cylinder to enable said piston to transmit force to said valve, the sum of said last mentioned forces tending to balance the force exerted upon said valve by said motive liquid whereby a variation in the pressure of said motive liquid will unbalance said forces and cause said valve to be moved in one direction or the other, means for limiting the pressure in said cylinder, and means operable in response to movement of said displacement varying member for adjusting said last named means to thereby vary the pressure in said cylinder.

21. In a pump having a member movable through a given range and shiftable in opposite directions to vary pump displacement between zero and maximum, means for urging said member toward maximum displacement position, a servo-motor for moving said member toward zero displacement position and means for supplying liquid to said servo-motor, the combination of a valve for controlling the flow of liquid to and from said servo-motor and being at all times subjected to pump pressure and urged thereby in a direction to direct liquid to said servo-motor, means for urging said valve in the opposite direction with a force which tends to balance the force exerted upon said valve by pump pressure whereby a variation in pump pressure will unbalance said valve and cause it to be moved in one direction or the other, and means operable in response to movement of said member only in that part of its range adjacent its zero displacement position for increasing the force which urges said valve in said opposite direction.

22. In a pump having a member movable through a given range and shiftable in opposite directions to vary pump displacement between zero and maximum, means for urging said member toward maximum displacement position, a servo-motor for moving said member toward zero displacement position and means for supplying liquid to said servo-motor, the combination of a valve for controlling the flow of liquid to and from said servo-motor and being at all times subjected to pump pressure and urged thereby in a direction to direct liquid to said servo-motor, means for exerting a substantially constant force upon said valve in the opposite direction, means for exerting an additional force upon said valve in said opposite direction, the sum of said last mentioned forces tending to balance the force exerted upon said valve by pump pressure whereby a variation in pump pressure will unbalance said valve and cause it to be moved in one direction or the other, and means operable in response to movement of said member only in that part of its range adjacent its zero displacement position for increasing said additional force.

23. In a pump having a member shiftable in opposite directions to vary pump displacement between zero and maximum, means for urging said member toward maximum displacement position, a servo-motor for moving said member toward zero displacement position and means for supplying liquid to said servo-motor, the combination of a valve for controlling the flow of liquid to and from said servo-motor and being at all times subjected to pump pressure and urged thereby in a direction to direct liquid to said servo-motor, means for exerting a substantially constant force upon said valve in the opposite direction, a cylinder arranged in a stationary position, a piston fitted in said cylinder, means for transmitting force from said piston to said valve in said opposite direction, means for supplying liquid under pressure to said cylinder to enable said piston to transmit force to said valve, the sum of said last mentioned forces tending to balance the force exerted upon said valve by pump pressure whereby a variation in pump pressure will unbalance said valve and cause it to be moved in one direction or the other, means for limiting the pressure in said cylinder, and means operable in response to said member approaching its zero displacement position for adjusting the last mentioned means to thereby increase the pressure in said cylinder.

ERNST WIEDMANN.